(12) United States Patent
Maguire

(10) Patent No.: US 10,099,674 B2
(45) Date of Patent: Oct. 16, 2018

(54) SYSTEM FOR CONTROLLING MANUAL CLUTCH

(71) Applicant: BorgWarner Inc., Auburn Hills, MI (US)

(72) Inventor: Joel Maguire, Hartland, MI (US)

(73) Assignee: BorgWarner Inc., Auburn Hills, MI (US)

( * ) Notice: Subject to any disclaimer, the term of this patent is extended or adjusted under 35 U.S.C. 154(b) by 57 days.

(21) Appl. No.: 15/278,010

(22) Filed: Sep. 27, 2016

(65) Prior Publication Data
US 2018/0086327 A1 Mar. 29, 2018

(51) Int. Cl.
| | |
|---|---|
| B60W 30/18 | (2012.01) |
| B60W 10/02 | (2006.01) |
| B60W 10/06 | (2006.01) |
| F16D 48/06 | (2006.01) |
| B60W 10/10 | (2012.01) |
| B60W 10/119 | (2012.01) |
| F02D 41/26 | (2006.01) |
| F02N 11/04 | (2006.01) |
| F16H 61/02 | (2006.01) |
| B60K 17/34 | (2006.01) |
| B60L 1/00 | (2006.01) |
| B60W 50/00 | (2006.01) |

(52) U.S. Cl.
CPC ............ *B60W 10/02* (2013.01); *B60W 10/06* (2013.01); *B60W 10/10* (2013.01); *B60W 10/119* (2013.01); *F02D 41/26* (2013.01); *F02N 11/04* (2013.01); *F16D 48/06* (2013.01); *F16H 61/0204* (2013.01); B60K 17/34 (2013.01); B60L 1/00 (2013.01); B60W 2050/0001 (2013.01); B60W 2710/02 (2013.01); B60W 2710/06 (2013.01); B60W 2710/10 (2013.01); B60W 2710/305 (2013.01); F16D 2500/10412 (2013.01)

(58) Field of Classification Search
None
See application file for complete search history.

(56) References Cited

U.S. PATENT DOCUMENTS

| | | | |
|---|---|---|---|
| 6,056,669 A * | 5/2000 | Marshall | ................. F16H 59/12 340/456 |
| 6,996,465 B2 | 2/2006 | Kim | |
| 7,224,145 B2 | 5/2007 | Pierret et al. | |
| 7,658,261 B2 | 2/2010 | Pfund | |
| 7,954,580 B2 | 6/2011 | Usoro | |
| 8,392,083 B2 | 3/2013 | Hodrus et al. | |
| 8,992,378 B2 | 3/2015 | Holmes et al. | |
| 9,707,963 B2 * | 7/2017 | Gibson | ................. B60W 10/02 |
| 2016/0272191 A1 * | 9/2016 | Atluri | ................... B60W 20/40 |

* cited by examiner

Primary Examiner — Adam D Tissot
(74) Attorney, Agent, or Firm — Harness, Dickey & Pierce, P.L.C.; John Artz

(57) ABSTRACT

An electronically operated autonomous manual transmission clutch system and a second electronically operated vehicle system, such as a belted alternator starter system (BAS), in which the ECU and micro controller of the second electronic system are utilized for both systems.

1 Claim, 3 Drawing Sheets

SYSTEM FOR CONTROLLING MANUAL CLUTCH

TECHNICAL FIELD

The present invention relates to electronic control systems for vehicles, and more particularly, for systems and methods for electronic control of manual clutches for vehicles.

BACKGROUND OF THE INVENTION

There is a movement today toward electronic control of accessories, components and systems in automobiles and other vehicles. This is particularly true for hybrid and other electronic vehicles, but applies as well to standard gasoline powered vehicles. Vehicles today are being equipped with more and more electronic systems and components.

The number and complexity of the electronic systems for vehicles have increased significantly over time. The systems originally were controlled with a single electronic control unit (ECU). Today there are numerous modular and individual systems, each of which typically include their own ECUs. Current vehicles may have up to 100 ECUs. One of the areas in which additional control is needed relates to manual transmissions for vehicles which utilize manual clutches to control the transmissions.

The ECUs and new electric control systems are expensive and often provide more power than is necessary to operate the particular functions or systems with which they are included. There is a need to reduce the number and expense of ECUs for vehicles and at the same time be able to fully operate all of the desired systems and accessories, as well as provide for new control systems which provide additional benefits.

SUMMARY OF THE INVENTION

The present invention provides power electronic control systems which meet these objectives. The autonomous manual transmission clutch control (AMTC) is a new and beneficial control system which has significant benefits in controlling the application of the clutch in a manual transmission system. This system can extend the life of the clutch components and the transmission itself. It can assist in operation of the vehicle in various situations, and increase gas mileage.

In order to reduce the cost of the AMTC system and reduce the number of new ECUs for a vehicle, the AMTC system can be paired with an existing electronic system. These other possible systems include, for example, an electronic belt alternator system (BAS) which is preferred, or an electronic general transmission control module (TCU), an electronic AWD transfer case system, or electronic general body control module (BCM) or the like. The AMTC includes a housing, a micro computer, communication infrastructure and a cooling system. The ECU and power electronic control for one of these other systems can be utilized to power and control the operation of the AMTC system. The underutilized micro controller and gate drive of the BAS system, for example, can be used to provide control, communication, and cooling of the AMTC system.

Other features, benefits and advantages of the present invention will become apparent from the following written description of the invention, in combination with the attached drawings and appended claims.

DESCRIPTION OF PREFERRED EMBODIMENTS

Autonomous manual transmission clutch control systems (AMTC) have been developed to beneficially control the clutch of a vehicle with manual transmissions. The clutch control provides improved transfer of torque between different transmission gears and speeds, and between shafts spinning at different speeds. This maintains the clutch plate partially engaged, allowing the clutch to slip. This has benefits particularly, for example, at low gear and low speeds, during uphill starts and with adverse road conditions.

AMTC systems include a power module and a micro gate controller (ECU) housed in a cold plate housing. The housing is cooled to maintain the electronics within acceptable operation temperature limits. The AMTC also has traditional three phase electric connections to a three phase motor that operates the clutch control. The AMTC communicates with a controller area network (CAN bus) which allows micro controllers and devices to communicate with each other in applications without a host computer.

Figure 1:
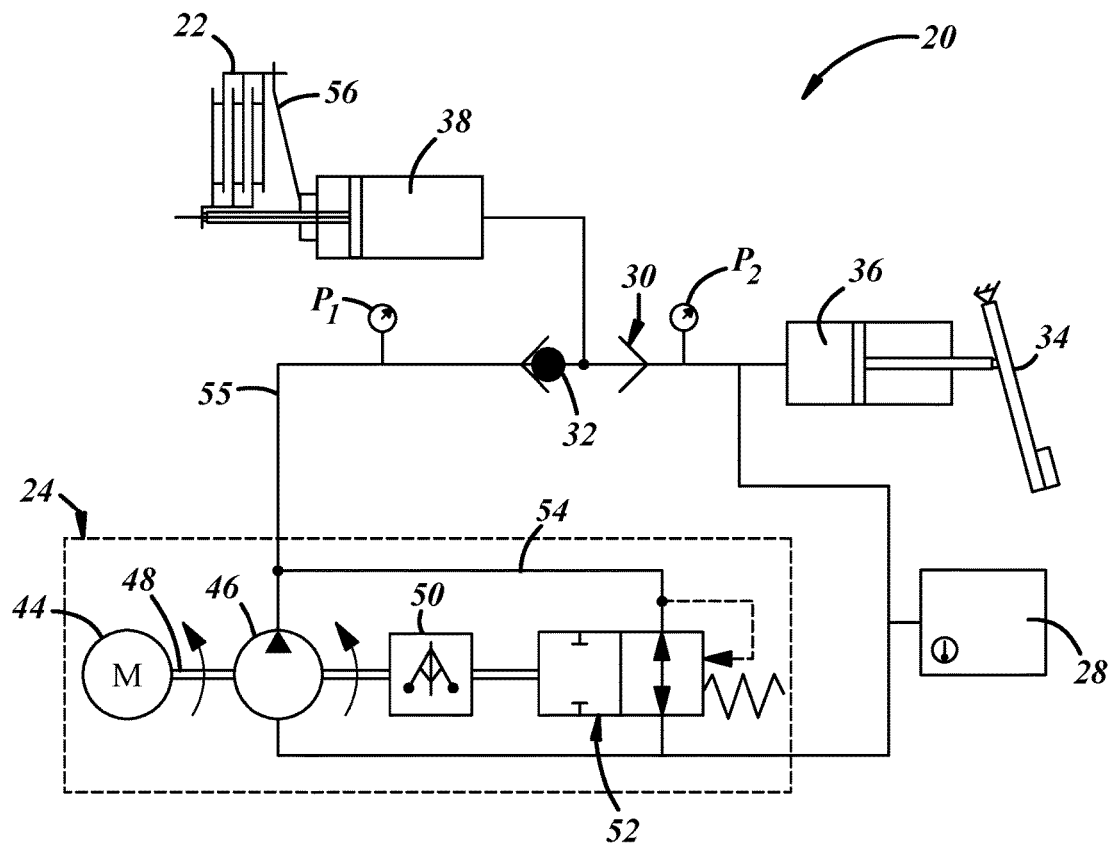
FIG. 1 illustrates an electronic clutch control system.

FIG. 1 illustrates a manual transmission system 20 for a vehicle. A manual transmission clutch system 20 is used to transmit or prevent the flow of power from the engine to the vehicle transmission. A clutch may comprise a single plate clutch or a multi-plate clutch 22, as illustrated in FIG. 1. A clutch 22 may be in an "ON", "OFF," or "slipping" mode. When the clutch 22 is in an ON mode, the engine and the transmission may be engaged which may allow the vehicle to be driven. When the clutch 22 is in an OFF mode, the clutch 22 may cause a disconnect in power between the engine and the transmission. This allows the engine to run while the vehicle is not in a driving mode and allows a driver to shift gears. When the clutch 22 is in a slipping mode, the clutch 22 may be in a condition which is neither in a fully ON or OFF mode and may transmit partial power between the engine and transmission.

In FIG. 1, the clutch system 20 includes a clutch 22 which is operatively connected to a slave cylinder 38. The slave cylinder 38 is adapted to be activated by pressure which may then control the clutch 22. Passive valves, such as a spool valve, a three-way check valve, or a three-way ball check valve 30, as illustrated in FIG. 1, may be operatively connected to the slave cylinder 38 to control the source of oil which can enter into the slave cylinder 38 either from the master cylinder 36 or a hydraulic power pack 24. The master cylinder 36 may be operatively connected to the three-way ball check valve 30. A clutch pedal 34 is operatively connected to the master cylinder 36. An operator can activate the clutch pedal 34 by manually stepping and/or pressing down on the clutch pedal 34 which causes pressure to increase from the master cylinder 36 to the three-way ball check valve 30. The pressure generated from the clutch pedal 34 causes a ball 32 in the three-way ball check valve 30 to change positions which allows oil from the master cylinder 36 into the slave cylinder 38, which causes the clutch 22 to go into OFF mode. A reservoir 28 may also be operatively connected to the master cylinder 36.

Figure 2:
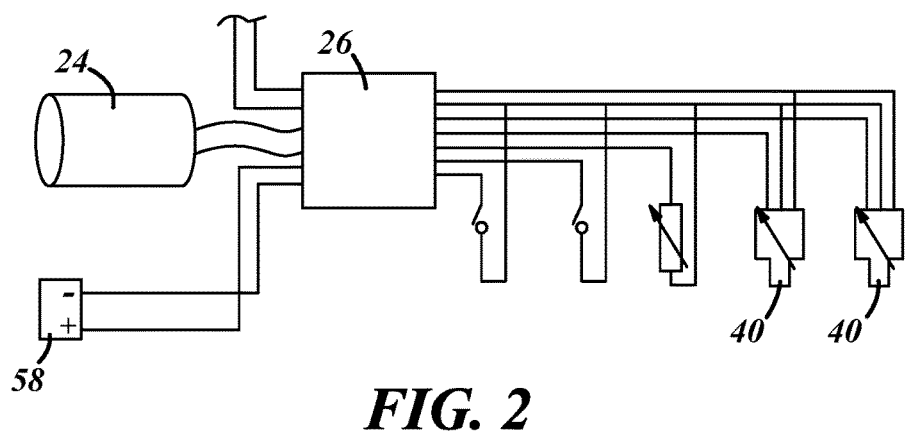
FIG. 2 illustrates an electronic control unit system which can be utilized with the clutch system of FIG. 1.

The hydraulic power pack actuator 24 is operatively connected to the three-way ball check valve 30. An electronic control unit 26 (ECU), as shown in FIG. 2, is connected to the hydraulic power pack actuator 24.

The clutch 22 may be in an ON mode by reducing the pressure to the slave cylinder 38 attached to the clutch 22. This may be done manually, by releasing the clutch pedal 34, or automatically by releasing pressure from the hydraulic power pack actuator 24. In a number of variations, the clutch 22 may be in an OFF mode by increasing the pressure to the slave cylinder 38 attached to the clutch 22. This may be done manually by stepping on the clutch pedal 34, or automatically by increasing the pressure from the hydraulic power pack actuator 24.

The hydraulic power pack actuator 24 includes an electric motor 44, a pump 46, a pressure regulator 50, and if desired, any number of pressure storage devices such as reservoir 28, and further including, but not limited to, an accumulator. In other embodiments, other hydraulic power pack actuators 24 may be used including, but not limited to, a centrifugal electro-hydraulic actuator 24. In a number of variations, a centrifugal electro-hydraulic actuator 24 could comprise an electric motor 44 which may drive an actuator pump 46 via a drive shaft 48, which also drives a centrifugal regulator 50. The position of the centrifugal regulator 50 controls the position of and the flow through one or more pressure overflow valves 52. Hydraulic oil used in the centrifugal electro-hydraulic actuator 24 system can be contained in the reservoir 28. The oil is drawn into the actuator pump 46 through hydraulic line 54 and delivered therefrom toward the three-way ball check valve 30 through a hydraulic line 55. Depending on the position of the centrifugal regulator 50 and thus the pressure overflow valve(s) 52, at least a portion of the hydraulic flow may be diverted through the hydraulic line 54, through the pressure overflow valve 52, and back into the reservoir 28. This results in the pressure delivered to the three-way ball check valve 30 being governed by the centrifugal regulator 50. The centrifugal electro-hydraulic actuator 24 could provide a linear relationship between pressure and motor current.

The pressure $P_1$ from the centrifugal electro-hydraulic actuator 24 may be high and the pressure P2 from the master cylinder 36 may be low or zero. In order to increase the pressure $P_1$ from the centrifugal electro-hydraulic actuator 24, the motor current may be increased which may increase the speed of the motor 44. This may cause the pressure overflow valve(s) 52 to close which may increase the pressure $P_1$. The pressure $P_1$ may then cause a ball 32 in the three-way ball check valve 30 to remain in a position blocking oil from reaching the slave cylinder 38 from the master cylinder 36. The oil from the centrifugal electro-hydraulic actuator 24 then passes through the three-way ball check valve 30 which activates the slave cylinder 38 which compresses the spring 56 in the clutch 22 which then sets the clutch 22 in OFF mode. In order to reduce the pressure $P_1$ from the centrifugal electro-hydraulic actuator 24, the motor current can be reduced which decreases the speed of the motor 44. This may cause the centrifugal overflow valve(s) 52 to open and pressure may bleed off which causes the excess oil to go into the reservoir 28. Even though pressure may be decreasing in the centrifugal electro-hydraulic actuator 24, the pressure may still be higher than the master cylinder 36 pressure, so the ball 32 in the three-way ball check valve 30 may remain in a position blocking oil from reaching the slave cylinder 38 from the master cylinder 36.

As the pressure from the centrifugal electro-hydraulic actuator 24 is decreased, the spring 56 in the clutch 22 may push the slave cylinder 38 away from the clutch 22 which may then set the clutch 22 in ON mode.

In steady state, the pressure overflow valve(s) 52 may be partially open to maintain a constant pressure.

The driver may manually activate the clutch pedal 34 which may increase the pressure P2 from the master cylinder 36 so that the pressure is greater than the pressure P1 coming from the centrifugal electro-hydraulic actuator 24. This may cause the ball 32 in the three-way ball check valve 30 to change its position so that it blocks any oil coming from the centrifugal electro-hydraulic actuator 24 and may allow oil from the master cylinder 36 into the slave cylinder 38. This may compress the spring 56 in the clutch 22 which may cause the clutch 22 to go into OFF mode.

The control unit 26 attached to the centrifugal electro-hydraulic actuator 24 may receive and process input from various sensors in light of stored instructions and/or data, and transmit output signals to various actuators. The control unit 26 may include, for example, an electrical circuit, an electronic circuit or chip, and/or a computer. In an illustrative computer variation, the control unit 26 generally may include one or more processors, memory devices that may be coupled to the processor(s), and one or more interfaces coupling the processor(s) to one or more other devices. The processor(s) and other powered system devices may be supplied with electricity by a power supply, for example, one or more batteries 58, fuel cells, or the like, as shown in FIG. 2. The control unit 26 used may be dedicated to control the centrifugal electro-hydraulic actuator 24 or the control unit used may already exist in the vehicle and may be used for the centrifugal electro-hydraulic actuator 24 as well as for other purposes.

The processor(s) may execute instructions that provide at least some of the functionality for the disclosed system 20 and methods. As used herein, the term instructions may include, for example, control logic, computer software and/or firmware, programmable instructions, or other suitable instructions. The processor may include, for example, one or more microprocessors, microcontrollers, application specific integrated circuits, programmable logic devices, field programmable gate arrays, and/or any other suitable type of electronic processing device(s).

Also, the memory device may be configured to provide storage for data received by or loaded to the engine system, and/or for processor-executable instructions. The data and/or instructions may be stored, for example, as look-up tables, formulas, algorithms, maps, models, and/or any other suitable format. The memory may include, for example, RAM, ROM, EPROM, and/or any other suitable type of storage article and/or device.

Further, the interfaces may include, for example, analog/digital or digital/analog converters, signal conditioners, amplifiers, filters, other electronic devices or software modules, and/or any other suitable interfaces. The interfaces may conform to, for example, RS-232, parallel, small computer system interface, universal serial bus, CAN, MOST, LIN, FlexRay™, and/or any other suitable protocol(s). The interfaces may include circuits, software, firmware, or any other device to assist or enable the control unit 26 in communicating with other devices.

The methods or parts thereof may be implemented in a computer program product including instructions carried on a computer readable medium for use by one or more processors to implement one or more of the method steps. The computer program product may include one or more software programs comprised of program instructions in source code, object code, executable code or other formats; one or more firmware programs; or hardware description language (HDL) files; and any program related data. The data may include data structures, look-up tables, or data in any other suitable format. The program instructions may include program modules, routines, programs, objects, components, and/or the like. The computer program may be executed on one processor or on multiple processors in communication with one another.

The program(s) can be embodied on computer readable media, which can include one or more storage devices, articles of manufacture, or the like. Illustrative computer readable media include computer system memory, e.g. RAM (random access memory), ROM (read only memory); semiconductor memory, e.g. EPROM (erasable, programmable ROM), EEPROM (electrically erasable, programmable ROM), flash memory; magnetic or optical disks or tapes; and/or the like. The computer readable medium also may include computer to computer connections, for example, when data is transferred or provided over a network or another communications connection (either wired, wireless, or a combination thereof). Any combination(s) of the above examples is also included within the scope of the computer-readable media. It is therefore to be understood that the method may be at least partially performed by any electronic articles and/or devices capable of executing instructions corresponding to one or more steps of the disclosed methods.

The electronic control unit 26 may receive signals from one or more sensors 40 and/or signals, for example as illustrated in FIG. 2, including, but not limited to, pressure and oil temperature sensors, a system enable switch, a gear change switch, and/or any signals from other sources. It may then process this information to determine whether one or more vehicle conditions including, but not limited to, semi-autonomous driving of the manual transmission in traffic congestion and/or situations where the driver is required to brake often while driving, creep, launch, or anti-stall are occurring. If signals are sent to the electronic control unit 26 that a vehicle condition including, but not limited to, semi-autonomous driving of the manual transmission, creep, launch, or anti-stall is occurring, the electronic control unit 26 may process the information and send signals to the centrifugal electro-hydraulic actuator 24 to modulate the pressure toward the check valve 30 which may cause the clutch 22 to go into an ON, OFF, or slipping mode. This may prevent or reduce stalling, improve the launch feel, and/or reduce high energy inputs to the clutch 22 associated with abusive maneuvers.

The electronic control unit 26 may also be configured with a software algorithm which may enhance stop-start, stop-start coasting, and/or enable sailing. In addition, stop-start may be enhanced by "stop in gear" which may allow the driver to leave the gear engaged as opposed to the driver having to move a lever to disengage all the gears (neutral). Sailing may occur when the clutch is disengaged when the vehicle is coasting to reduce braking of the vehicle. Stop-start coasting may be similar to sailing, but the engine may also be stopped while coasting. The engine may then be quickly restarted and the clutch 22 may be engaged when the driver steps back on the gas pedal.

The centrifugal electro-hydraulic actuator 24 also may be operatively connected to the reservoir 28 or may be a self-contained pressure source.

In any number of variations, if the pressure P1 generated from the centrifugal electro-hydraulic actuator 24 is greater than the pressure P2 generated from the clutch pedal 34, then the centrifugal electro-hydraulic actuator 24 may automatically control the clutch 22. If the pressure P2 generated from the clutch pedal 34 is greater than that generated from the centrifugal electro-hydraulic actuator 24, then the clutch 22 may be controlled manually by the clutch pedal 34.

The hydraulic power pack 24 may be implemented into a dry clutch system or a wet clutch system. In a variation where a wet clutch system may be used, a hydraulic power pack 24 may also provide lubrication and/or cooling oil to the clutch 22.

An electronic control unit (ECU) relative to vehicles is a generic term for any embedded system that controls one or more of the electrical system or subsystems of a vehicle. Types of ECUs include, for example, engine control modules (ECM), powertrain control modules (PCM), transmission control modules (TCM), brake control modules (BCM or EBCM), body control modules (BCM), and suspension control modules (SCM). Key elements of an ECU include housing, a micro controller, memory (e.g. SRAM or EEPROM), inputs (supply voltage, digital and analog inputs), outputs (logic output, drivers (relay, H bridge, injector), a circuitboard, and communication links. The ECU receives input from sensors or other systems and can include both hardware and software required to perform the functions for which they are designed, or can be connected to hardware or devices which are activated to perform such functions.

Figure 3:
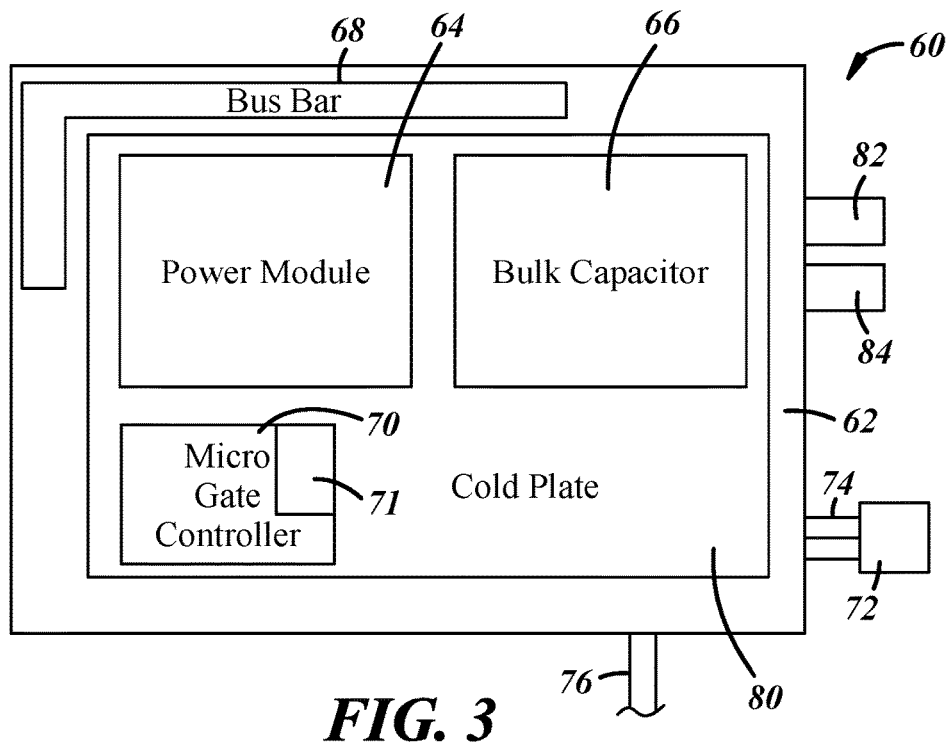
FIG. 3 is a block diagram of a power electronic architecture for a representative electronic actuator.

FIG. 3 depicts a typical electronic module 60 in the schematic form of building blocks. This is one of the representative forms for an autonomous manual transmission clutch electronic system. The modular system includes a housing 62, an electronic power module 64, a bulk capacitor 66, a bus bar 68 and a micro motor gate controller 70. The electronics in the module are connected to a micro motor 72 by 3-plane connector 74. The module also electronically communicates to the computer area network (CAN) by electrical connection 76. The area 71 in the micro gate controller represents the amount of unutilized micro which could be available for other uses or systems.

The module 60 includes a cold plate 80 in order to dissipate the heat generated by the power module and other electronics. Cold plates (or cooling plates) provide circulation of a liquid coolant through the module. Inport 82 and Outport 84 are used to circulate the coolant into and out from the module 60. Cold plates include, for example, tube-in-plate systems, and aluminum vacuum-brazed and copper-brazed systems, for various applications. The tube-in-plate system includes copper or stainless steel pressed into a channeled aluminum or copper extruded or machined plate. Some cold plates include external fins to assist in dissipating the heat to the atmosphere. The liquid coolants can be, for example, water, water/glycol solutions, dielectric fluids, oils or synthetic hydrocarbons. The modules are typically included in a coolant circulation system or network where coolant is circulated to and from each of the power modules as part of an entire network or system.

In order to minimize the cost of an AMTC module or system in accordance with the present invention, the AMTC module utilizes or pairs up with another power electronic system and utilizes the micro cooling and communication of that other system. These capabilities do not have to be duplicated in the AMTC which saves cost and packaging space. There is not a dedicated ECU or motor to control the electric clutch for the manual transmission.

The ECU functionality is included within the electronic position of another power electronic system in the vehicle, such as, for example, a BAS system. Other possible systems which could be utilized include an advanced alternator system, an electronic general transmission clutch module (TCU), an electronic AWD transfer case system, or an electronic body control module (BCM). Other possible systems that can be utilized are a P2 module (commercially available from Borg-Warner for use with hybrid-electric vehicles), a GenV/iVcoupling (commercially available from Haldex for use with All Wheel Drive Systems), DCT module ("Dual Clutch Transmission" module, commercially available from Borg-Warner), and a general engine control module (ECU). The preferred paired system at this time is the BAS system.

As indicated, BAS is the acronym for a belted alternator system. This is a category of vehicle hybrid technology that uses an electric motor to contribute power to the internal combustion engine's crank shaft via a serpentine belt. BAS replaces a belt driven alternator in a vehicle with an electric motor that serves as both a generator and a motor. By mounting such a motor generator unit where a conventional alternator would be located, a lower cost method of adding mild hybrid capabilities, such as start-stop, power assist, and certain levels of regenerative braking is achieved. BAS differs from other hybrid systems since BAS systems are not run off the vehicle's crankshaft.

Figure 4:
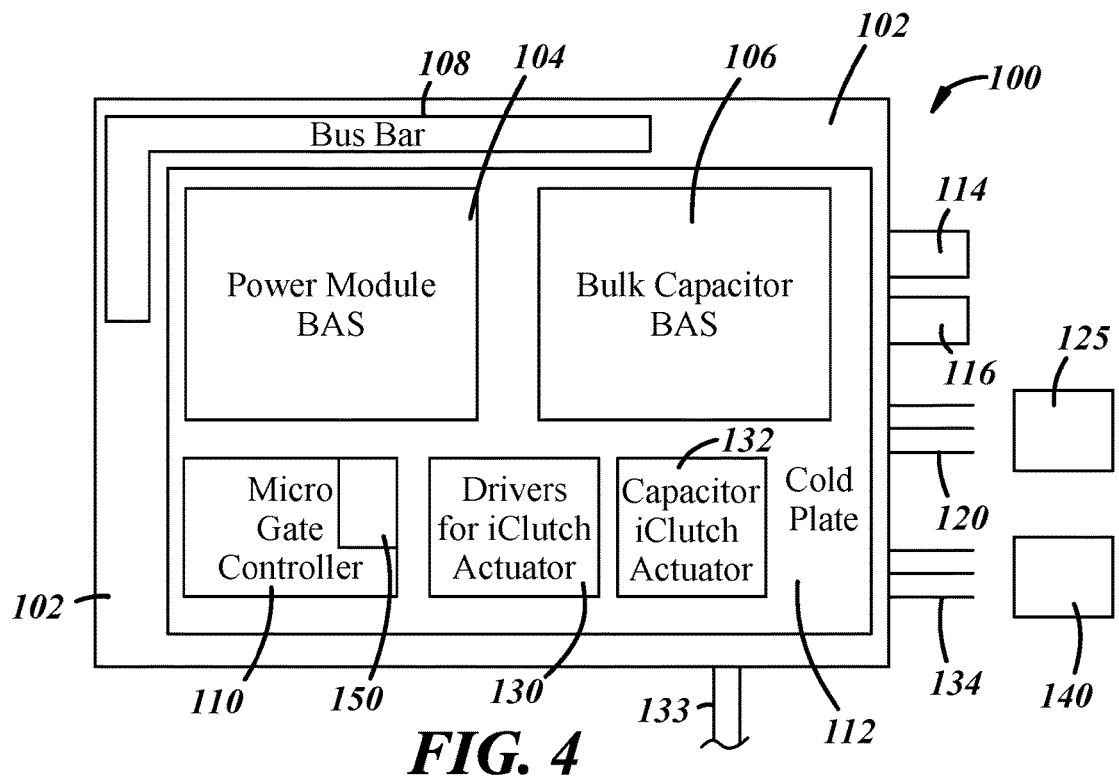
FIG. 4 is a block diagram of a power electronic architecture for an embodiment of the present invention.

FIG. 4 shows a block form of a module 100 that depicts a BAS electronic system in which the ECU and motor are being used for both the BAS and the AMTC. The module 100 includes a housing 102 with BAS power module 104, a BAS bulk capacitor 106, a bus bar 108 and a micro motor gate controller 110. The module housing 102 also includes a cold plate 112 with an inport 114 and outport 116 for liquid coolant. Also included are 3-phase electrical connectors 120 to the BAS micro motor 125 and appropriate connectors 133 to the CAN network.

For the AMTC system, a plurality of drivers 130 and a capacitor 132 for the clutch actuation are provided, along with 3-phase electrical connectors 134 to the clutch pump 140.

Area 150 in the micro motor date controller 110 in FIG. 4 represents the available throughput that the BAS system has which can be used to operate the electronic AMTC clutch.

Figure 5:
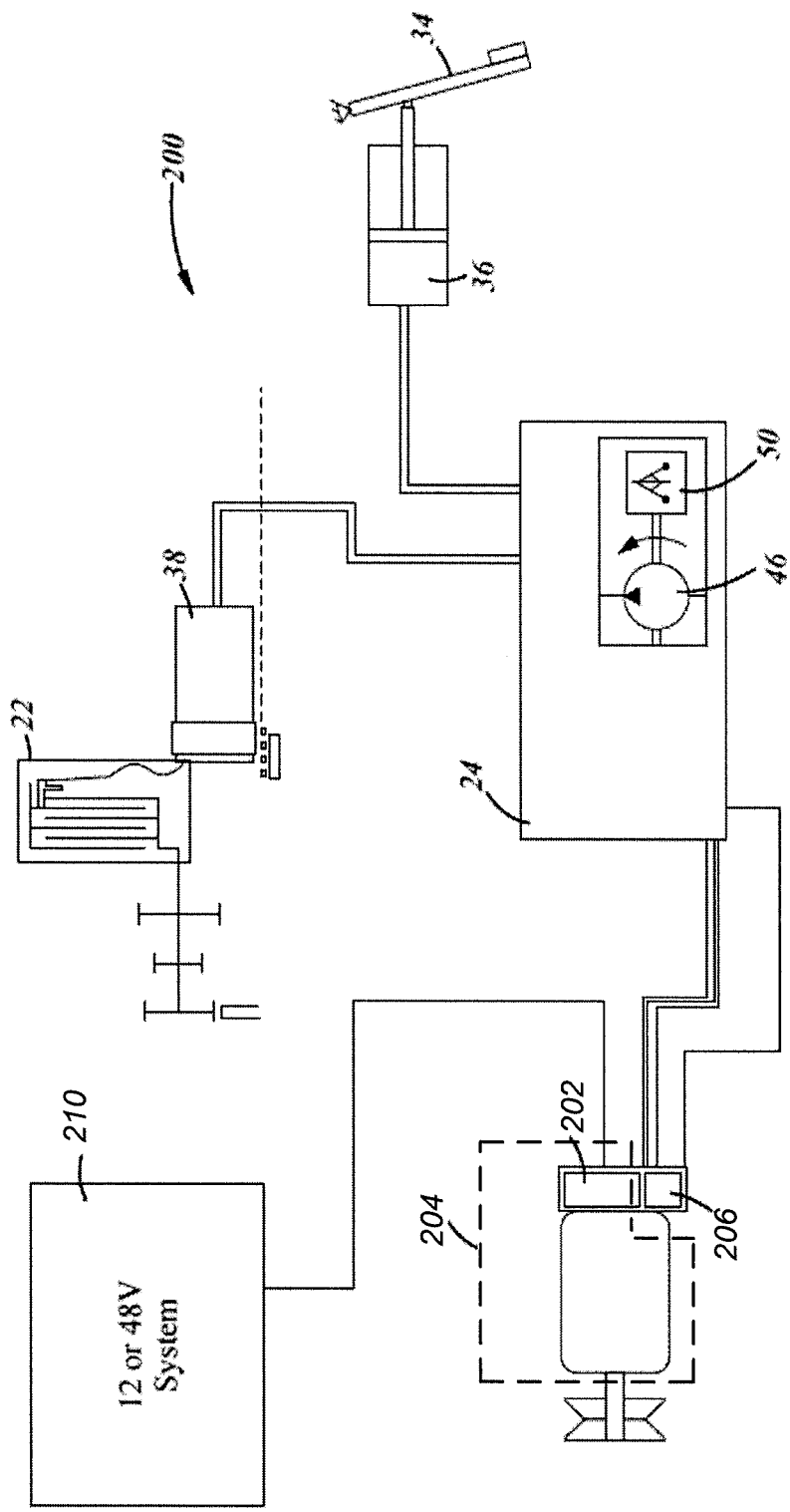
FIG. 5 illustrates an electronic clutch system in accordance with an embodiment of the present invention.

FIG. 5 is a schematic illustration of an AMTC 206 and BAS system 204 which utilize the same ECU and micro motor controller to operate their respective systems. The combined system is identified generally by the reference numeral 200. The clutch member 22, slave cylinder 38, master cylinder 36 and clutch pedal 34 are the same as those depicted and discussed above with respect to FIGS. 1 and 2. The pump 46 and centrifugal pressure regulator 50 are positioned in the hydraulic pressure pack 24, along with the sensors and other components for the AMTC (as shown in FIGS. 1 and 2).

The micro controller 202, which is used for the BAS system 204, is used to drive the BAS system 204 and the AMTC system 206. A battery 210 is also utilized in the system. The micro controller 202 has extra throughput to control the AMTC. The AMTC ECU functionality is provided within the electronics portion of the BAS system.

Another system similar to the BAS system and which could be paired with the AMTC system is an advanced alternator system. The advanced alternator system could include the use of active MOSFET rectification technology, communication and the use of a micro controller. These items could also be used to control the AMTC.

A transfer case is part of the drive train of multiple powered axle vehicles, such as four-wheel drive and all-wheel drive (AWD) vehicles. The transfer case transfers power from the transmission to the front and rear axles by means of drive shafts. It also synchronizes the difference between the rotation of the front and rear wheels, and may contain one or more sets of low range gears for off-road use. The transfer of power can be accomplished manually or electronically and can be accomplished with gears, hydraulics, or chain drive. The electronic transfer cases typically include an electronics module and a motor, with the module containing an ECU, adaptor, sensors, a bus and other conventional electronic components.

Body control modules (BCM), are typically responsible for monitoring and controlling various electronic accessories in a vehicle's body. They can monitor and control, for example, power windows, power mirrors, air conditioning, central locking and the like. The BCMs contain the typical electronic modules, including an ECU, circuitboard, and the like and monitor and react to signals from sensors. If needed to activate a device, the BCMs are connected to a micro motor or micro controller, or the like to perform that function. The BCM communicates with other onboard computers through the vehicle bus, and its main application is controlling local drivers, and activating relays that in turn perform actions in the vehicle, such as locking the door or dimming the overhead lamps.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. An electronic system for a vehicle comprising:
 a first electronics system for operating a first component or accessory for a vehicle, the first electronics system including a belt alternator starter system (BAS);
 said first electronics system comprising a power electronic system with an ECU and microcontroller for controlling the BAS; and
 a second electronics system, said second electronics system including an autonomous manual transmission clutch (AMTC) system with a set of drivers dedicated to implementing functionality of the AMTC system;
 said microcontroller of said first electronics system implements:
  functionality of the BAS; and
  functionality of the AMTC system using the plurality of drivers dedicated to the AMTC system.

* * * * *